United States Patent [19]
Gonsalves et al.

[11] Patent Number: 5,384,145
[45] Date of Patent: Jan. 24, 1995

[54] LOW-FAT, FROZEN WHIPPED TOPPING

[75] Inventors: Alexander A. Gonsalves, Libertyville; Everett D. Dudley, Jr., Chicago; Gerard J. Hogan, Mount Prospect, all of Ill.

[73] Assignee: Kraft General Foods, Inc., Northfield, Ill.

[21] Appl. No.: 109,281

[22] Filed: Aug. 19, 1993

[51] Int. Cl.⁶ .......................... A23L 1/19; A23P 1/08
[52] U.S. Cl. ...................................... 426/565; 426/570
[58] Field of Search ............... 426/570, 564, 565, 566, 426/567

[56] References Cited

U.S. PATENT DOCUMENTS

| | | | |
|---|---|---|---|
| 3,350,209 | 10/1967 | Rodgers | 426/576 |
| 3,353,965 | 11/1967 | Patterson | 426/570 |
| 3,431,117 | 3/1969 | Lorant | 426/565 |
| 3,889,001 | 6/1975 | Buide et al. | 426/565 |
| 3,968,267 | 7/1976 | Ogasa et al. | 426/570 |
| 4,251,560 | 2/1981 | Dell et al. | 426/565 |
| 4,411,926 | 10/1983 | Trumbetas et al. | 426/565 |
| 4,451,492 | 5/1984 | Dell et al. | 426/564 |
| 4,478,867 | 10/1984 | Zobel et al. | 426/570 |
| 4,505,943 | 3/1985 | Dell et al. | 426/565 |
| 4,578,276 | 3/1986 | Morley | 426/565 |
| 5,077,076 | 12/1991 | Gonsalves | 426/565 |

Primary Examiner—Jeanette Hunter
Attorney, Agent, or Firm—Thomas R. Savoie; Thomas A. Marcoux

[57] ABSTRACT

A low-fat, frozen whipped topping having a fat content of 8 to 15% and which is free of milk solids and phosphate salts is formulated using weight ratios of from 1.4 to 2.2 parts chemical emulsifier and 5.0 to 6.0 parts sodium caseinate per 100 parts fat. A low-fat, non-dairy, frozen whipped topping can be prepared employing the teachings of this invention.

9 Claims, No Drawings

LOW-FAT, FROZEN WHIPPED TOPPING

BACKGROUND OF THE INVENTION

1. Field of the Invention

This invention relates to a formulation and process for producing a low-fat, preferably non-dairy, frozen whipped topping which will be freeze-thaw stable and which will retain a stable foam structure and texture after twenty-one days of refrigerator (40° F.) storage.

2. Description of the Prior Art

Compositions and processes for preparing either dairy or non-dairy frozen whipped toppings are known in the art. U.S. Pat. Nos. 3,431,717 to Lorant, 4,411,926 to Trumbetas et al., 4,251,560, 4,451,452 and 4,505,943 to Dell et al., and 4,478,867 to Zobel et al. relate to such compositions and processes. The disclosures of these patents enable the production of freeze-thaw stable, frozen whipped toppings which are distributed as frozen products, which are thawed prior to use, and which can be stored in the refrigerator for up to 21 days without textural breakdown. The aforementioned prior art patents related to frozen whipped toppings wherein the fat content is about 20% or more. U.S. Pat. No. 5,077,076 to Gonsalves et al. has disclosed formulations and processes which have enabled the production of comparably stable, frozen whipped topping having a fat content reduced to 15% or below. It has been found, however, that the low-fat formulation of the Gonsalves et al. patent is quite sensitive to changes in processing conditions with the result being that the mix does not consistently whip to the desired extent during commercial production and does not provide consistent stability in the finished product.

DESCRIPTION OF THE INVENTION

This invention enables the production of a frozen whipped topping which has a low fat content of from about 8% to 15% and has an overrun in excess of 250%, which is freeze thaw stable and refrigerator stable for up to 21 days, and which easily and consistently whips to a high overrun in commercial processing.

According to the aforementioned Gonsalves et al. patent, it was thought that a combination of non-fat milk solids and phosphate salts was necessary for the production of a stable, frozen whipped topping having a fat content below 20%. To date, commercially-successful, low-fat or "light" frozen whipped toppings have employed a combination of milk solids and phosphate salts. It has now been found that it is possible to formulate low-fat frozen whipped toppings in the absence of non-fat milk solids and phosphate salts. The elimination of these ingredients, in accordance with this invention, has an obvious cost advantage and has been found to not reduce the frozen or refrigerator stability of the product. Also, the elimination of non-fat milk solids, especially milk proteins, appears to facilitate the ability of the formulation to whip to a high overrun in commercial processing. Further, the elimination of milk solids from the formulation will permit the production of a non-dairy, low-fat whipped topping.

All ratios and percents (except overrun) used in the description of this invention are by weight.

The objects and advantages of this invention are enabled by controlling the weight ratio of chemical emulsifiers to fat and water-soluble protein (e.g., sodium caseinate) to fat in the formulation. According to this invention these ranges are for chemical emulsifier per 100 parts fat of from 1.4 to 2.2, preferably 1.8 to 2.1, and for protein per 100 parts fat of from 5.0 to 6.0, preferably 5.4 to 5.8. The ratio of water-soluble protein to emulsifiers should be from 2.2 to 4.3, preferably 2.4 to 3.4.

The recited levels of chemical emulsifiers and protein have been found to be critical to the commercial production of low-fat, frozen whipped toppings in the absence of non-fat milk solids. Specifically, these levels are sufficiently high to obtain a foamed emulsion which has good stability and these levels are sufficiently low to enable easy and consistent whipping of the liquid emulsion into a high overrun foam.

The frozen whipped toppings of this invention will have a total solids level of about 38 to 50%, including a fat level of about 8 to 15%, and an overrun in excess of 250, preferably about 300.

Hydrocolloid stabilizing agents, such as polysaccharide gums, are also required in the formulations of this invention at a level of from 0.05 to 1%, preferably 0.1 to 0.3%. These stabilizers are also believed to assist in providing structure to the foam, improving the mouthfeel of the product and preventing syneresis. Vegetable or synthetic gums such as carrageenan, xanthan, guar, locust bean, alginate and the like, or carboxymethylcellulose, methylcellulose ether and the like, and mixtures thereof should be useful in this invention. A combination of xanthan gum and a galactomannan gum, such as locust bean gum and/or guar gum, at a ratio of between about 0.5-2 to 1 has proven to be useful in this invention.

The fats used in the formulation of this invention are preferably the vegetable fats or oils commonly employed in frozen whipped toppings. Such fats or oils may be fully or partially hydrogenated. Hydrogenated oils, such as coconut and palm kernel oil, have typically been used in the production of frozen whipped toppings. Animal fats, such as milk fat, would be functional in the formulation of this invention, but the use of animal fats in low-fat products is not common and is preferably avoided, especially in the production of non-dairy formulations. Partially hydrogenated vegetable oils such as cottonseed, peanut, olive, corn, soy or the like could be useful for use in this invention.

Among the emulsifying agents which may be useful in this invention are: the monoglycerides of fatty acids, such as monostearin; polyoxyalkylene ethers of fatty esters of polyhydric alcohols, such as the polyoxyethylene ethers of sorbitan monostearate (i.e., polysorbate 60); fatty esters of polyhydric alcohols, such as sorbitan monostearate; esters of glycol and fatty acids, such as propylene glycol monostearate; partial esters of carboxylic acids with glycerides of fatty acids, such as glyceryl lactopalmitate; and polyglycerol esters of fatty acids. Preferably a combination of emulsifying agents is employed; polysorbate 60 and sorbitan monostearate at about a 2-3:1 ratio has proven to be useful in this invention.

Water-soluble carbohydrates are employed in the formulation at a level of from 26 to 36% to supply solids and sweetness. Mono and disaccharides (e.g., dextrose, sucrose, fructose) may be included in the formulation to provide the desired sweetness. The formulations of this invention also require the presence of tri- or higher saccharides which appear to improve the stability of the product. Specifically, at least 25% preferably at least 30%, of the total saccharides are tri- or higher saccharides. Typically, these tri- and higher saccharides will be added in the form of sugar syrups; however, the addition of maltodextrins or other hydrolyzed starch solids would be possible.

Various flavors, colors or nutritional ingredients may be added in minor amounts in order to produce a commercially-acceptable product.

The frozen whipped topping of this invention may be prepared generally in accordance with the process set forth in the U.S. Pat. Nos. 4,478,867 to Zobel et al. and 5,077,076 to Gonsalves et al., both of which are hereby incorporated by reference. Accordingly, the ingredients are batched and the formulation is then homogenized at a pressure of at least 6,000 psi. The homogenized mixture is then pasteurized and cooled in a heat exchanger down to about 40° F. (4.4° C.) and then held for at least 45 minutes in order to permit the fat to crystalize, and apparently to allow for a rearrangement of protein and emulsifying agents. The resulting emulsion is then aerated in a continuous mixer having a mixing pressure of from about 45 to 100 psig and a mixing temperature of from about 40° F. (4.4° C.) to about 55° F. (12.8° C.).

The emulsion is aerated by incorporating air or an inert gas such as nitrogen or carbon dioxide in an amount sufficient to produce an overrun in the final product of from 250 to 350%, preferably about 300%. The pressure of the aerated emulsion is then reduced by about 10 to 60 psig in a continuous and gradual manner by conventional means, such as conveying the emulsion through one or more tubes or pipes having a diameter and length sufficient to effect the desired pressure reduction. Preferably this pressure reduction steps occurs over a period of at least 5 seconds in order to permit equilibration of air cells.

The pressure-reduced emulsion is then whipped. Whipping may be done in an open mixer, such as a Hobart® mixer, but preferably is done in a closed vessel, such as a jacketed, scraped-surface heat exchanger. According to a preferred embodiment, whipping is done at a pressure of about 20 to about 70 psig and a temperature of about 40° F. (4.4° C.) to about 60° F. (15.6° C.). The closed vessel may, in fact, be comprised of a plurality of connected heat exchangers in order to better control the temperature of the emulsion during whipping. As noted in the Zobel et al. patent the amount of shear employed during the whipping step is controlled in order to produce a product with the desired texture.

After the product has been whipped to the desired extent, the pressure is then reduced to atmospheric pressure in a gradual and continuous manner. This pressure reduction may also be effected by means of a length of pipe or tubing having the appropriate diameter and length. Upon reaching atmospheric pressure, the temperature of the whipped emulsion should be from about 50° F. (10.0° C.) to about 60° F. (15.6° C.). In typical plant operation the whipped emulsion is passed to a filler, packaged in containers for retail sale and frozen at 0° F. (−17.8° C.) or below.

The following example further illustrates various features of this invention but is not intended to in any way limit the scope of the invention, which is defined in the appended claims.

| Ingredient | Weight % |
|---|---|
| Water | 46.99 |
| Hydrogenated Coconut/Palm Kernel Oil | 14.00 |
| Corn Syrup (42DE, 80% solids) | 26.40 |
| High Fructose Corn Syrup (42% conversion, 71% solids) | 4.50 |
| Sugar Syrup (67° Brix) | 6.49 |
| Sodium Caseinate | 0.79 |
| Emulsifying Agents | 0.28 |
| Vegetable Gums | 0.17 |
| Flavors & Colors | 0.38 |

All of the ingredients were added to a batch mixer and mixed at about 140° F. (60° C.) for about 5 minutes. The mix which had a solids content of about 43.8% was then passed to a two stage homogenizer at 8,000 psig first stage and 600 psig second stage. The homogenized mix was then heated up to about 173° F. (76.7° C.) for at least about 12 seconds to achieve pasteurization. The resulting emulsion was cooled to about 43° F. (6.1° C.) and held at this temperature under agitation for about 60 minutes. The cooled emulsion was then fed to a continuous recycle mixer where sufficient air was introduced in order to produce an overrun of 300% in the final product. The pressure in the mixer was about 80 psig. The emulsion exited the mixer at 49°–50° F. and was fed through a 14 foot length of one-inch pipe at a flow rate of about 105 pounds per minute. The exit pressure from the pipe was about 32 psig. The emulsion was then passed through a series of four, cooled, scraped-surface heat exchangers where it is whipped and from which it exits at a temperature of about 52° F. (11.1° C.). The pressure on the whipped emulsion is reduced to atmospheric by passage through a 14 foot length of 2 inch piping. The final aerated whipped emulsion had a temperature of about 55° F. (12.8° C.) (−17.8° C.). The product was put in containers and frozen to a temperature of 0° F. The product, which had a caloric density of about 43 calories per 60 ml serving, was judged to be freeze-thaw stable and the thawed product was judged to have high-quality flavor, texture and overrun, comparable to Non-Dairy Cool Whip® Frozen Whipped Topping, even after 21 days of refrigerator storage (40° F./4.4° C.).

Having thus described the invention, what is claimed is:

1. A low-fat, frozen whipped topping formulation which easily and consistently whips to a high overrun in commercial processing, having a total solids level of about 38 to 50% by weight and comprising water, water-soluble carbohydrates, fat, chemical emulsifier, water-soluble protein and hydrocolloid stabilizing agent and containing on a weight basis from 8 to 15% fat, from 0.05 to 1% hydrocolloid stabilizing agent, about 1.4 to 2.2 parts chemical emulsifier per 100 parts of fat, about 5.0 to 6.0 parts by weight of water-soluble protein per 100 parts of fat and wherein the formulation is free of non-fat milk solids.

2. The frozen whipped topping of claim 1 wherein the topping is also free of phosphate salts.

3. The frozen whipped topping of claim 1 wherein water-soluble carbohydrates are present at a level of from 26 to 36% by weight.

4. The frozen whipped topping of claim 1 wherein the ratio of water-soluble protein to chemical emulsifiers is from 2.2 to 4.3.

5. The frozen whipped topping of claim 4 wherein the ratio is from 2.4 to 3.4.

6. The frozen whipped topping of claim 5 wherein the water-soluble protein is sodium caseinate.

7. The frozen whipped topping of claim 1 wherein the water-soluble protein is sodium caseinate.

8. The frozen whipped topping of claim 7 wherein the weight of chemical emulsifier per 100 parts of fat is about 1.8 to 2.1.

9. The frozen whipped topping of claim 8 wherein the weight of sodium caseinate per 100 parts of fat is about 5.4 to 5.8.

* * * * *